May 13, 1952  R. D. FINNELL  2,596,847
SIGNAL DEVICE FOR INDICATING OVERHEATED
BEARINGS AND THE LIKE
Filed Oct. 18, 1950

Inventor
RUSSELL D. FINNELL
BY
Lamphere & Van Valkenburgh
ATTORNEYS

Patented May 13, 1952

2,596,847

UNITED STATES PATENT OFFICE 2,596,847

SIGNAL DEVICE FOR INDICATING OVER-
HEATED BEARINGS AND THE LIKE

Russell D. Finnell, Orange, Tex.

Application October 18, 1950, Serial No. 190,793

9 Claims. (Cl. 200—142)

This invention relates to signal devices, and more particularly to signal devices for indicating overheating of bearings and the like. Such signal devices are particularly useful for railway car and similarly located bearings, which are difficult or impossible to inspect or observe during all or a portion of the time, such as during movement of a train.

Since the development and widespread use of lubricated bearings, the prevention of damage due to overheating has been an ever present problem. Such damage may be only to the bearing itself, involving the expense of replacement only, but more often involves damage to other parts or structures, as well as the possible loss of human life or commodities. Normally, a bearing becomes overheated when lubrication fails, due to exhaustion of lubricant through use or drainage, or failure of a system supplying the lubricant. In the case of motors, machines and the like installed in a relatively stationary position, such as steam turbines, electric motors, and the like, the temperature at the various bearings may be observed through thermometers or thermocouples, or merely by an operator feeling the temperature by hand. However, in the case of railway car axles, for instance, the bearings for which are generally located in a position which is unobservable and inaccessible to the train crew while the train is in motion, the problem is considerably more difficult. To install a thermocouple at each bearing of each car of a long railway train would involve a tremendous cost, as well as an unduly complicated signal system. Nevertheless, delays in train operation, as well as accidents, many of which are very serious and involve loss of life, are of frequent occurrence. Overheated bearings are perhaps more common in the case of simple sleeve bearings or journals, but also can and do occur with roller bearings and other improved types of bearings. These overheated bearings and resulting accidents also occur despite relatively frequent inspection and similar precautions.

In certain previous attempts to solve the problem of overheated bearings, it has been proposed to utilize the property of certain metals, usually alloys of low melting point metals, such as lead, tin, zinc and the like, to close an electrical circuit when a bearing reaches a predetermined temperature, i. e. the melting point of the fusible material, such predetermined temperature being either below the melting point of the material of the bearing itself or sufficiently above normal operating temperatures that it is an indication that an overheated condition exists and would tend to become accentuated by further use of the bearing. Such previous devices incorporated fusible plugs formed of such alloys, but have usually been too expensive to be applied to each of the individual bearings of all the railway cars, such expense including not only initial cost but also installation and/or maintenance costs. Thus, such proposed devices have included spring pressed contacts held apart by a fusible metal plug, such contacts being closed when the metal melts; or one and often two wires or conductors extending through an insulator, with a plug or the like of fusible material disposed adjacent thereto, the plug upon melting completing the circuit between the two conductors or between a single conductor and the bearing structure. Such prior devices have generally been installed on one or more tapped or threaded holes in a bearing structure, and thus involve the cost of tapping the hole, as well as the additional cost of threaded parts of the device itself. In addition to the initial cost of parts which must generally be accurately produced, such devices have been susceptible to leakage of moisture or the like, which tends both to cause corrosion and result in poor contact, or form a contact and thereby produce a false alarm or other signal when the bearing is not overheated.

In railway car installations, it has been proposed to utilize a signal device of the above type to control the air brakes, so that the brakes on the train would be set whenever a bearing becomes overheated, but this involves undue complications in the braking system. Moreover, it is sufficient if the presence of an overheated bearing is called to the attention of the train crew within a sufficient time for the crew to act. Thus, it is generally sufficient to provide a single indicator or master alarm for an entire train, which, however, will be actuated whenever any bearing along the length of the train becomes overheated. This may be accomplished by connecting one electrical lead to all of the indicating devices at the bearings and utilizing the track as the ground lead, or connecting two electrical leads to the indicating devices at the bearings, to provide a path for current back to the master alarm, from any bearing which becomes overheated.

Among the objects of this invention are to provide a novel signal device for indicating overheated bearings and the like; to provide such a device which can be utilized with either a single or a two wire system; to provide such a device which is sufficiently simple in construction that the cost of a relatively large number of the same is not unduly high; to provide such a device which is readily installed; to provide such a device which is adequately sealed, to prevent the entrance of moisture; to provide such a device which is adequately locked in position; to provide such a device which does not require threaded connections; to provide such a device which does not require accurately machined parts; and to provide such a device which is composed of inexpensive parts, which are readily securable.

Additional objects and the novel features of this invention will become apparent from the description which follows, taken in connection with the accompanying drawings, in which.

Figure 1:
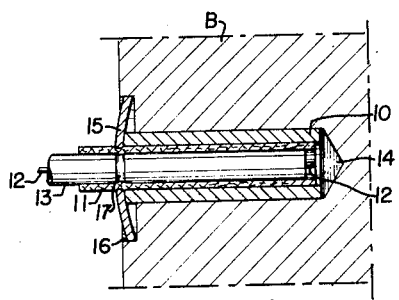
Fig. 1 is a fragmentary cross section of a bearing structure in which a device constructed in accordance with this invention is installed.

As illustrated in Fig. 1, a signal device constructed in accordance with this invention may be installed in a bearing structure B, which is not necessarily the bearing itself, but may be any metal part sufficiently close to or forming the supporting structure for the bearing, whereby heat will be conducted through the metal of the bearing structure B in sufficient amount and without undue dissipation so that a fusible sleeve 10 will melt when a predetermined temperature of the bearing is reached. Fusible sleeve 10 is preferably cylindrical and formed of a metal or alloy having a melting point corresponding to that at which the signal device is desired to be actuated. Fusible sleeve 10 surrounds an insulating tube or bushing 11, which in turn surrounds a wire or conductor 12 covered by insulation 13. The device is installed in an unthreaded hole 14, drilled in the bearing structure B, the parts being so placed that the exposed end of wire 12 is spaced from the inner end of the hole 14 and also from the fusible sleeve 10.

Figure 2:
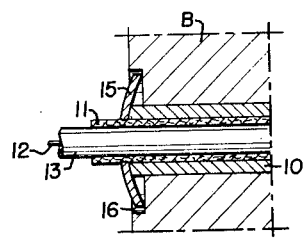
Fig. 2 is a similar view, but illustrating the position of parts of the device during installation.

In accordance with this invention, the parts may be locked in the hole 14 by a washer 15, which is preferably outwardly bowed and made of deformable material, or of resilient material, so that it may be driven inwardly until its outer edges engage a counterbore 16, formed at the outer end of hole 14, conveniently at the same time that the hole 14 is drilled. The washer 15, which prior to installation may have a shape similar to the shape shown in Fig. 2, not only engages the counterbore 16 at its outer edge when driven into place, but its inner edge may compress the insulating bushing 11 and insulation 13 on wire 12, as to form a groove 17. In addition, when the washer 15 is driven into place, its inner surface forces the fusible sleeve 10 into compression and in relatively tight engagement with the wall of hole 14, thus not only additionally locking the device in the hole, but also sealing the inner end of the hole against seepage of moisture or the like, which otherwise might tend to collect therein and cause a short, i. e. complete the electrical circuit between the inner end of wire 12 and the bearing structure B.

Figure 3:
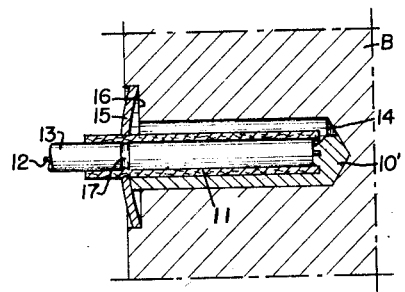
Fig. 3 is a fragmentary cross section similar to Fig. 1, illustrating the action of fusible metal in completing an electrical circuit when the bearing has become overheated.

Whenever the bearing becomes overheated, heat is conducted from the bearing structure B to the fusible sleeve 10, and when the temperature reaches the melting point of the sleeve, the sleeve will melt and flow into the end of hole 14, as in Fig. 3, thereby depositing metal 10' in the hole 14 to a level above the level of the end of wire 12 and forming an electrical connection between the end of wire 12 and the bearing structure B. Such electrical connection may be utilized to actuate a signal, alarm, control device or the like, to produce an indication to a train crew, for instance, that a bearing has become overheated. The predetermined temperature corresponding to the melting point of sleeve 10 is, of course, preferably below a temperature at which there would be any danger of the bearing freezing, burning out, or otherwise being destroyed or tending to cause damage to or interference with the operation of the train or other apparatus in which the signal device is installed. Since bearings are preferably operated at a comparatively low temperature, the metal of fusible sleeve 10 may be chosen so as to have a melting point of only a few hundred degrees, and preferably a temperature sufficiently below the flash point of the oil or grease, for instance, utilized as a lubricant for the bearing, so that the danger of a fire being started by ignition of the oil will be lessened or obviated.

Figure 4:
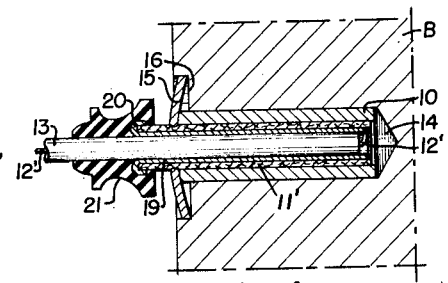
Fig. 4 is a similar cross section, illustrating a modified type of device, also constructed in accordance with this invention.
Figure 5:
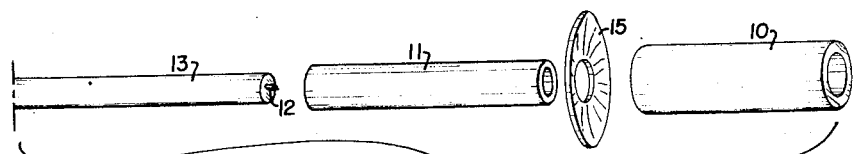
Fig. 5 is an exploded perspective view of the parts of the device of Fig. 1.

As illustrated in Fig. 4, a slightly different construction may be utilized, by which the wire 12' may be placed in position with a slightly greater degree of accuracy, and the possibility of seepage of water or the like between the insulating sleeve 11' and the covering 13 of the wire 12' is additionally prevented. The inner end of wire 12' may be attached, as by soldering or the like, to the inner end of a metal sleeve 19 having a flange 20 at its outer end, adapted to extend over the outer end of insulating sleeve 11' and position both metal sleeve 19 and the inner end of wire 12' within the insulating sleeve 11'. Of course, the end of wire 12' must be spaced from the inner end of hole 14, but with wire 12' attached to metal sleeve 19, in turn attached by flange 20 to insulating sleeve 11', the distance in the hole which the wire extends is more readily determined from the outside. As before, a fusible sleeve 10 may surround insulating sleeve 11', while a washer 15 may be disposed in counterbore 16, being driven into engagement with the insulating sleeve 11' and also forcing fusible sleeve 10 into the hole 14 and causing the sleeve to be compressed against the sides of the hole, thereby effecting a seal around the insulating sleeve 11', particularly adjacent the outer end of the hole. In addition, a plug 21 of rubber or other suitable material, is provided with a hole through which wire covering 13 may pass and also with suitable flanges or lips adapted to cover the outer end of metal sleeve 19 and insulating sleeve 11'. Plug 21 is placed on the wire and pushed onto the end of metal sleeve 19, and is made of sufficiently resilient material that it will tend to grip tightly both the wire covering 13 and the outer end of sleeve 19, thereby producing an effective seal against the entrance of water or moisture, immediately around the wire covering 13. As will be evident, the seal around the outer end of insulating sleeve 11' and metal sleeve 19 may be produced in any other desired manner, although the plug 21, or a removable seal of any other desired type, permits the device to be replaced with a minimum of difficulty. In the event the fusible sleeve 10 has melted, the locking washer 15 and the rubber plug 21 are adapted to be saved as parts.

Figure 6:
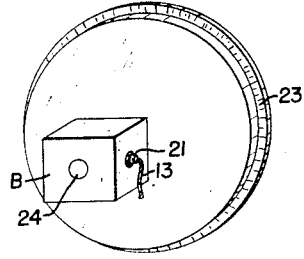
Fig. 6 is a perspective view, on a reduced scale, of a car wheel and railway journal box, the latter having a device of this invention installed therein.

As illustrated in Fig. 6, the signal device of this invention may be applied to a bearing structure B, which includes a bearing for an axle 24 of a car wheel 23, it being understood that the relative proportions of the parts are not shown accurately, but out of proportion to permit the smaller parts to be shown with greater clarity. Thus, the wire covering 13 may extend from the rubber plug 21, as shown, the wire inside covering 13 extending into hole 14 (not shown in Fig. 6), and the various parts described above being installed therein. As will be evident, the installation illustrated in Fig. 6 is a single wire installation, i. e. the bearing structure B is the ground connection, the current flowing to the axle 24, to the car wheel 23, and through the track back to another car wheel which is connected to the opposite side of a circuit, one side of which is connected to the wire within covering 13. A two wire system may, of course, be utilized, in which another wire is connected directly to the bearing structure B, although such a system would be generally more expensive than one requiring only a single wire for the signal circuit. Two wires may also be utilized in lieu of the single wire 12 or 12', so that when the fusible metal melts, it will form an electrical connection between the ends of the wires, which are of course spaced from the inner end of the hole 14 and neither or only one of which is attached to sleeve 19 of Fig. 4 in the event the latter is utilized. With such a two wire lead, both wires may extend to the signal or alarm device adapted to inform trainmen or the like of an overheated bearing. Each bearing of a train, for instance, is preferably provided with one of the devices, with the signal devices in parallel, connected to the same wire, in either a single wire or two wire circuit. With the signal devices connected in parallel, the signal which indicates an overheated bearing does not indicate the location of the bearing in the train, although provision for the same may be made by an appropriate electrical circuit.

From the foregoing, it will be evident that the signal device of this invention fulfills to a marked degree the requirements and objects hereinbefore set forth. The signal device is sufficiently simple in construction that the cost of a large number is not unduly high, while the cost of installation and maintenance is reduced to a minimum by the use of the spring washer for clamping the device in position. As indicated previously, the cost of installation is further reduced by the fact that the hole 14 and counterbore 16 are readily made, as at the same time, and do not involve expensive threading and tapping operations. Furthermore, the device of this invention does not necessarily require any threaded parts, while none of the parts require a high degree of accuracy in manufacture, particularly machining, since the wedging action of the washer 15 tends to compensate for any slight variation in inner or outer diameter of the fusible sleeve 10, or the diameter of the insulating sleeve 11 or 11' or wire covering 13.

Figure 7:
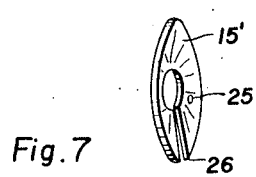
Fig. 7 is a perspective view of an alternative washer.

It will be understood, of course, that certain variations may be made in the device of this invention, such as different types of metal for the fusible sleeve, different types of material for the insulating sleeve, different types of metal or connections between the sleeves 19 and 11' of Fig. 4, and the substitution of different types of sealing devices for the plug 21. Also, the washer may be provided, if desired and as in the case of washer 15' of Fig. 7, with a hole 25 for insertion of a tool for removal of the same, such as after sleeve 10 has melted. When made of resilient material, the washer may be split, as by a slot 26 of washer 15', and at the time of installation, the slot of the washer may be placed at the lower side of the hole, to provide for drainage of moisture or water entering through the hole formed by the slot. It will be understood that the fact that the washer may have a slot therein does not mean that the device is not sealed, since a seal is provided by the fusible sleeve 10. The device may also be utilized in connection with bearings other than railway car bearings.

Although more than one embodiment of this invention has been illustrated and described, and variations in the same indicated, it will be understood that other embodiments and other variations may exist, without departing from the spirit and scope of this invention.

What is claimed is:

1. A signal device for indicating an overheated metal bearing and the like, wherein the bearing structure has a cylindrical hole extending into metal of said bearing structure, at least the inner end of said hole being in heat conducting relation to a portion of said bearing which may become overheated, said device comprising a sleeve formed of fusible metal and disposed within said hole, said hole having a counterbore at the outer end and the outer end of said fusible sleeve extending into said counterbore; an insulating bushing within said fusible sleeve, the inner end of said bushing extending to a point adjacent the inner end of said sleeve; an insulated wire extending within said bushing, the inner end of said wire being spaced from the inner end of said hole and also spaced from said sleeve; and an outwardly bowed, annular washer disposed in said counterbore, said washer being driven into said counterbore until its outer edge engages said counterbore, and its inner surface engages said fusible sleeve, whereby said sleeve is compressed into sealing engagement with the wall of said hole.

2. A signal device for indicating an overheated metal bearing and the like, wherein the bearing structure has a cylindrical hole extending into metal of the bearing structure, at least the inner end of said hole being in heat conducting relation to a portion of said bearing which may become overheated, said device comprising a cylindrical sleeve formed of fusible metal and disposed within said hole, said hole having an unthreaded counterbore at its outer end and the outer end of said fusible sleeve extending into said counterbore; a cylindrical insulating bushing within said fusible sleeve, the inner end of said bushing extending to a point adjacent the inner end of said sleeve and the outer end of said bushing extending outwardly from said sleeve; an insulated wire extending within said bushing, the inner end of said wire being spaced from the inner end of said hole and also spaced from said sleeve; and an outwardly bowed, annular washer disposed in said counterbore, said washer being driven into said counterbore until its outer edge engages said counterbore, its inner edge engages said bushing, and its inner surface engages said fusible sleeve, whereby said inner edge deforms a portion of said bushing inwardly and said sleeve is compressed into sealing engagement with the wall of said hole, to lock said device in said hole and simultaneously to seal said hole to prevent moisture or the like from seeping to the inner end thereof.

3. A signal device for indicating an overheated metal bearing and the like, wherein the bearing structure has a cylindrical hole extending into metal of said bearing structure, at least the inner end of said hole being in heat conducting relation to a portion of said bearing which may become overheated, said device comprising a cylindrical sleeve formed of fusible metal and disposed within said hole, said hole having an unthreaded counterbore at the outer end and the outer end of said fusible sleeve extending into said counterbore; a cylindrical insulating bushing within said fusible sleeve, the inner end of said bushing extending to a point adjacent the inner end of said sleeve and the outer end of said bushing extending outwardly from said sleeve; a metal sleeve within said bushing and extending to a point adjacent the inner end thereof, said sleeve having a flange at its outer end and in attaching relation to said bushing; an insulated wire extending within said bushing, the inner end of said wire being spaced from the inner end of said hole and attached to the inner end of said metal sleeve, the end of said wire also being spaced from said fusible sleeve; an insulating plug surrounding said wire insulation and also the flange of said metal sleeve and the outer end of said bushing, said plug being formed of resilient material and gripping said wire insulation and said sleeve flange and bushing in sealing relation thereto; and an outwardly bowed, annular washer disposed in said counterbore, said washer being driven into said counterbore until its outer edge engages said counterbore, its inner edge engages said bushing, and its inner surface engages said fusible sleeve, whereby said inner edge deforms a portion of said bushing inwardly and said sleeve is compressed into sealing engagement with the wall of said hole, to lock said device in said hole and simultaneously to seal said hole to prevent moisture or the like from seeping to the inner end thereof.

4. A signal device for indicating an overheated metal bearing and the like, wherein the bearing structure has a hole extending into metal of the bearing structure, at least the inner end of said hole being in heat conducting relation to a portion of said bearing which may become overheated, said device comprising a hollow sleeve formed of fusible metal and disposed within said hole, said hole having a counterbore at its outer end and the outer end of said fusible sleeve extending outwardly into said counterbore; a wire extending within said sleeve in spaced relation thereto, the inner end of said wire being spaced from the inner end of said hole; insulation between said fusible sleeve and said wire; and a generally annular washer disposed in said counterbore, said washer being driven into said counterbore until its outer edge engages said counterbore, and its inner surface engages said fusible sleeve, whereby said sleeve will be compressed into sealing engagement with the wall of said hole.

5. A signal device for indicating an overheated metal bearing and the like, wherein the bearing structure has a hole extending into metal of the bearing structure, at least the inner end of said hole being in heat conducting relation to a portion of said bearing which may become overheated, said device comprising the combination of a hollow sleeve formed of fusible metal and disposed within said hole; an electrical conductor extending within said sleeve, the inner end of said conductor being spaced from the end of said hole and said conductor being spaced from said sleeve; and insulation between said conductor and said sleeve, said sleeve being in sealing engagement with said hole and said insulation at a point outwardly from the inner end of each of said sleeve and said insulation.

6. A signal device for indicating an overheated bearing and the like, wherein the bearing structure has a hole extending into metal of the bearing structure, at least the inner end of said hole being in heat conducting relation with a portion of said bearing which may become overheated, said device comprising the combination of a hollow sleeve formed of fusible metal and disposed within said hole; an electrical conductor extending within said sleeve, the inner end of said conductor being spaced from the end of said hole and said conductor being spaced from said sleeve; insulation between said conductor and said sleeve; and means for simultaneously locking said device in said hole and compressing at least a portion of said sleeve into sealing engagement with said hole.

7. A signal device for indicating an overheated metal bearing and the like, wherein the bearing structure has a hole extending into metal of the bearing structure, at least the inner end of said hole being in heat conducting relation to a portion of said bearing which may become overheated, said device comprising the combination of a hollow sleeve formed of fusible metal and disposed within said hole, said hole having a counterbore at its outer end; an electrical conductor extending within said sleeve, the inner end of said conductor being spaced from the end of said hole and said conductor being spaced from said sleeve; insulation between said conductor and said sleeve; and means in said counterbore for locking said device in said hole and simultaneously compressing at least a portion of said sleeve into sealing engagement with said hole.

8. A signal device for indicating an overheated metal bearing and the like, wherein the bearing structure has a hole extending into metal of the bearing structure, at least the inner end of said hole being in heat conducting relation to a portion of said bearing which may become overheated, said device comprising a hollow sleeve formed of fusible metal and disposed within said hole, an insulating bushing within said fusible sleeve; a metal sleeve within said bushing and attached at its outer end to the outer end of said bushing; and an insulated wire extending within said metal sleeve, the inner end of said wire being attached to the inner end of said metal sleeve and spaced from the inner end of said hole.

9. A signal device for indicating an overheated metal bearing and the like, wherein the bearing structure has a hole extending into metal of the bearing structure, at least the inner end of said hole being in heat conducting relation to a portion of said bearing which may become overheated, said device comprising the combination of a hollow sleeve formed of fusible metal and disposed within said hole, said hole having a counterbore at its outer end; an electrical conductor extending within said sleeve, the inner end of said conductor being spaced from the end of said hole and said conductor being spaced from said sleeve; insulation between said conductor and said sleeve; and a washer in said counterbore for locking said device in said hole and simultaneously compressing at least a portion of said sleeve into sealing engagement with said hole.

RUSSELL D. FINNELL.

REFERENCES CITED

The following references are of record in the file of this patent:

UNITED STATES PATENTS

| Number | Name | Date |
| --- | --- | --- |
| 1,015,119 | Asmus | Jan. 16, 1912 |
| 1,825,052 | Cleveland | Sept. 29, 1931 |

FOREIGN PATENTS

| Number | Country | Date |
| --- | --- | --- |
| 21,966 | Great Britain | Sept. 21, 1905 |